Patented June 7, 1949

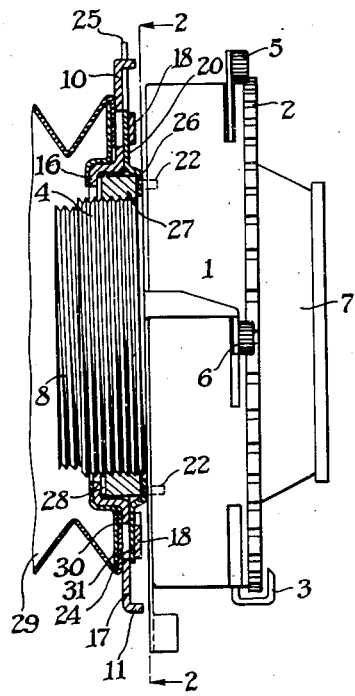
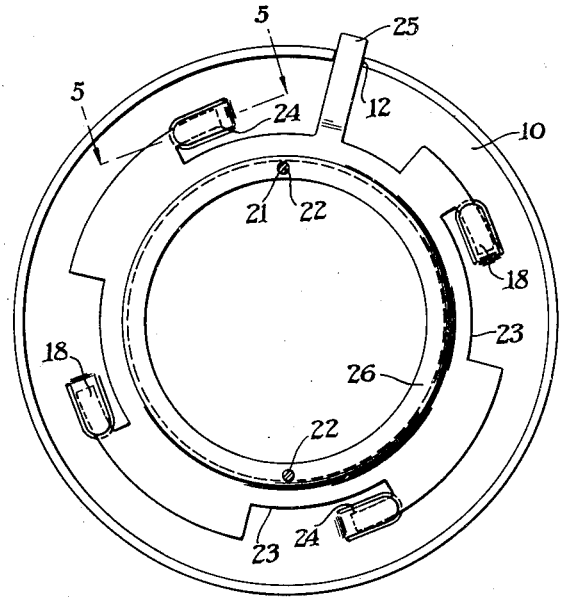
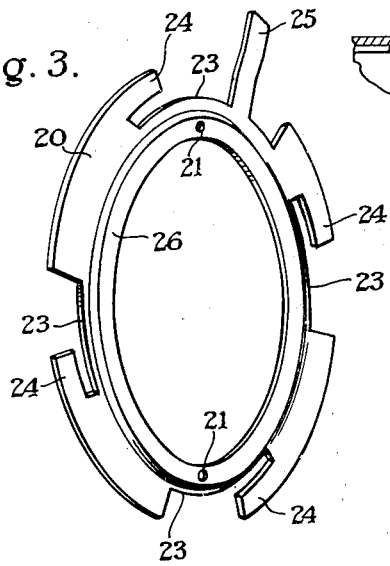
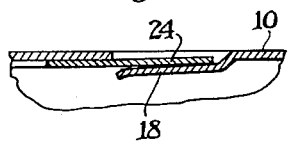
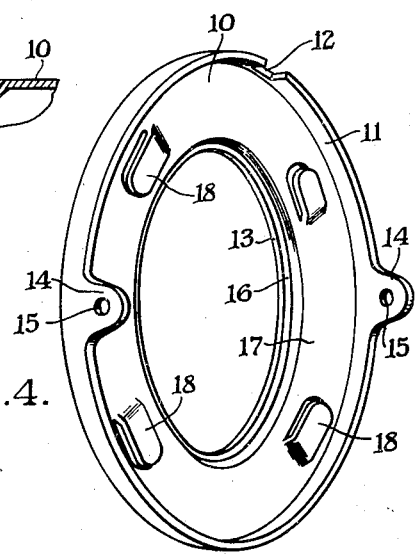
Douglass C. Harvey
INVENTOR

2,472,586

UNITED STATES PATENT OFFICE 2,472,586

DETACHABLE SHUTTER MOUNT FOR CAMERAS

Douglass C. Harvey, Rochester, N. Y., assignor to Eastman Kodak Company, Rochester, N. Y., a corporation of New Jersey Application April 20, 1946, Serial No. 663,704

3 Claims. (Cl. 95—53)

This invention relates to detachable shutter mounts by which a shutter and objective can be quickly and easily attached to a camera. An object of my invention is to provide a simple mechanism by which a lens and shutter may be attached to, or detached from, a camera. Another object of my invention is to provide a simple type of latching mechanism which will accurately retain a lens and shutter in the proper position on a camera body. A further object of my invention is to provide a shutter-latching mechanism with a means for producing a light-tight joint between the shutter and camera, and other objects will appear from the following specification, the novel features being particularly pointed out in the claims at the end thereof.

It is customary in attaching lenses and shutters to cameras, and especially to cameras which include bellows, to take special precautions to prevent the entrance of light around the shutter and into the camera body. It is desirable with certain types of cameras to detach lenses and shutters, as this occasionally is done in substituting lenses of one focal length for another on special types of cameras, and it is also extremely useful to provide a latching arrangement between a shutter and camera, since it facilitates assembling cameras in production and disassembling the shutter from the camera for repairs, or for other purposes.

Coming now to the drawings wherein like reference characters denote like parts throughout:

Fig. 1 is a side elevation of a typical shutter and objective, and including in section a detachable mount by which the shutter and lens may be attached;

Fig. 2 is a front elevation of the latching mechanism removed from the camera;

Fig. 3 is a perspective view of a latching plate which is carried by the shutter;

Fig. 4 is a similar view of the lens board including one set of latching elements removed from the camera; and Fig. 5 is a fragmentary detail sectional view taken on line 5—5 of Fig. 2.

My invention consists in providing a bayonet type of latch by which a lens and shutter may be quickly attached to, or detached from, a camera. A preferred embodiment of my invention shown in the drawings indicates a standard type of camera shutter 1 which may have a shutter speed adjusting ring 2, a diaphragm adjusting pointer 3 and a rearwardly-extending lens tube 4. The shutter may have the usual setting lever 5 and shutter release 6 although, obviously, my invention can be equally well applied to an automatic rather than a setting type of shutter. A front lens element may be carried in a focusing cell 7 if the objective is of the type that lens elements are moved relative to other lens elements to adjust the focal length. A rear lens element may be contained in the ring 8 which is screwed into an interior thread on the lens tube 4. As thus far described, the shutter may be of any known type, as the mount is particularly designed for attaching and detaching a shutter to a camera.

The camera may include a lens board 10, shown in Fig. 4, as consisting of a generally circular member having an outstanding edge flange 11 notched at 12 and having an axial opening 13 through which the lens tube 4 of the shutter may project. The lens board may be provided with ears 14 apertured at 15 for receiving a suitable support, such as a self-erecting front mechanism. Around the aperture 13 there is an offset recess 16 which consists of a flange formed backwardly and then inwardly from the plane of the wall 17 of the lens board. This lens board is provided with a plurality of punched-out fingers 18; four being used in the present instance to form one set of bayonet latch elements.

A latching plate 20, as shown in Fig. 3, is attached to the shutter 1 to turn with the shutter. The plate 20 carries apertures 21 which, as best shown in Fig. 2, may engage pins 22 on the shutter so that the latching plate 20 is keyed to the shutter. This plate is provided with a series of notches 23, four being shown in the drawing, these notches leaving fingers 24 which form bayonet latch elements adapted to pass under the punched-out fingers 18 on the lens board. An arm 25 extends substantially radially away from the latching plate 20. This arm is adapted to spring into the notch 12 in the lens board 10, thus latching the plate in place with the fingers 24 engaged under the punched-out members 18 to hold the shutter in its operative position.

The latching plate 20 has a recess 26 resembling somewhat the recess 16, but formed in an opposite direction, as best indicated in Fig. 1. The reason for this is that a nut 27, which is preferably of a round shape, may be turned by the notches 28 into a position to hold the latching plate firmly against the shutter 1. In addition, the nut 27, by extending into the recesses 16 and 26, forms a light-obstructing member which prevents any light which might possibly pass down between the latching plate and the lens board from entering the bellows 29, thus fogging a film carried at the opposite end of the bellows. The bellows 29 includes a fold 30 held against the lens board 10 by means of a frame 31. Any light which might pass down between the bellows and the lens board through an improper connection between the two, would be prevented from passing into the camera by means of the frame 31 and the offset recess 16 in the lens board.

I preferably make the lens board 10 of relatively heavy metal, so that the front board is quite rigid. The latching plate 20 is preferably made of a lighter and somewhat springy material, so that the fingers 24 which enter beneath the formed-up members 18 of the lens board securely hold the latching plate and with it the shutter to the lens board and so that the arm 25 may have sufficient spring to snap down into the aperture 12 to hold the parts in assembled relationship. If it is desirable to prevent the camera user from removing the lens in its shutter it may be desirable to cut off the projecting portion of the arm 25 above the notch 12, so that this releasing lever will not be noticeable but so that it can be operated with a suitable instrument to remove the shutter with its lens for any necessary repairs. On the other hand, if the shutter and lens are to be removed and replaced with an objective of a different focal length mounted in a shutter, it is preferable to have the arm 25, as shown in the drawings, where it is accessible to an operator.

The operation of this shutter latch, like the latch itself, is extremely simple in that in order to place the lens and shutter on a camera, the latching plate is laid flush with the lens board on the inside of the inwardly-projecting flange 11 and with the fingers 24 in position to engage the punched-out lugs 18. A slight clockwise movement of the shutter will cause the bayonet latch members to engage, and when the arm 25 snaps into the notch 12, the shutter is securely latched in its operative position.

I claim:

1. A mount for attaching a shutter, having a rear lens tube, to a camera, said mount comprising a metal lens board adapted to be carried by the camera, a recess in the lens board, a nut adapted to fit into the recess, a plurality of flat lugs projecting from the lens board lying substantially parallel thereto and constituting hook-like members, formed of the metal lens board and overlying apertures therein, a notched flange projecting from the lens board, a latching plate having a recess therein fitting the nut, the lens board and latching plate having coaxially arranged central apertures to receive tthe rear lens tube of the shutter, the nut having a threaded engagement with the lens tube for holding the latching plate on the shutter, a plurality of flat lugs carried by the latching plate for engagement with the flat hook-like members of the lens board to hold the plate to the lens board, and a latch arm positioned on the latching plate for engaging the notch in the flange projecting from the lens board, the latch arm having a resiliency enabling it to snap into, or be sprung out of, latching engagement with the notch.

2. A mount for attaching a shutter to a lens board, as defined in claim 1, characterized by the flat lugs of the latching plate being resilient and being adapted to flex into the openings in the metal lens board lying beneath the flat lugs projecting therefrom.

3. A mount for attaching a shutter to a lens board, as defined in claim 1, characterized by the offset recesses in the lens board and latching plate extending around opposite sides of, and forming light-tight connections with, the nut.

DOUGLASS C. HARVEY.

REFERENCES CITED

The following references are of record in the file of this patent:

UNITED STATES PATENTS

| Number | Name | Date |
|--------|------|------|
| 900,081 | Brownell | Oct. 6, 1908 |